April 7, 1953 W. TINGLEY 2,634,348
ELECTROMAGNETIC SEQUENCE RELAY SWITCH
Filed Aug. 14, 1951 2 SHEETS—SHEET 1

INVENTOR.
Warren Tingley
BY Smith, Olsen & Baird
Attys.

April 7, 1953 W. TINGLEY 2,634,348
ELECTROMAGNETIC SEQUENCE RELAY SWITCH
Filed Aug. 14, 1951 2 SHEETS—SHEET 2
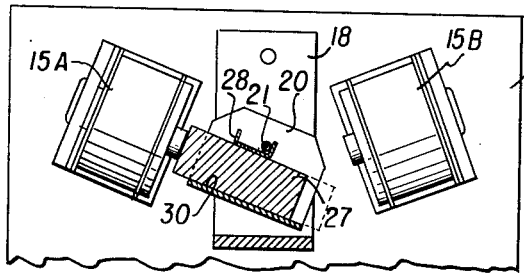
FIG. 4A
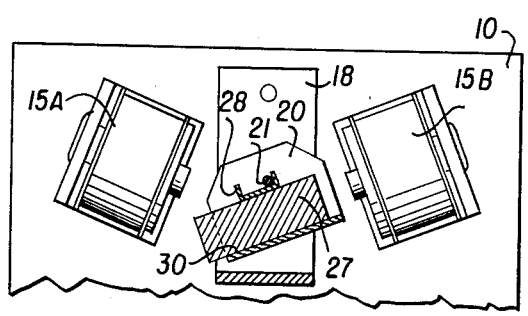
FIG. 4B
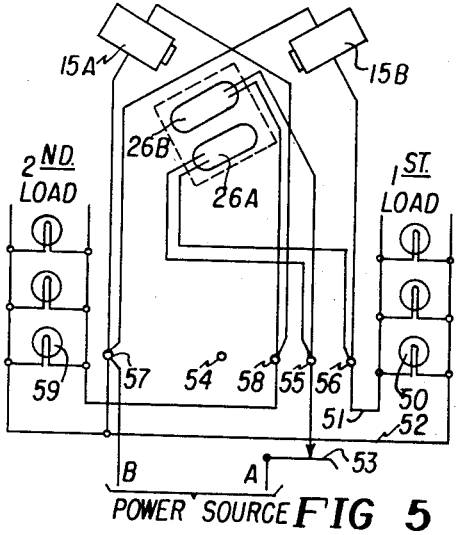
FIG. 5
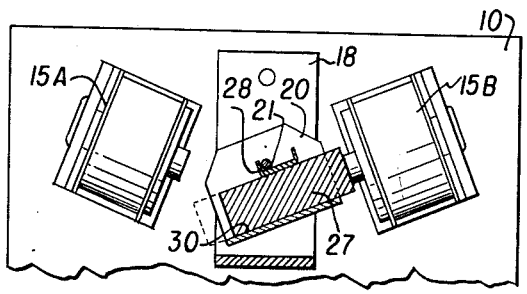
FIG. 4C
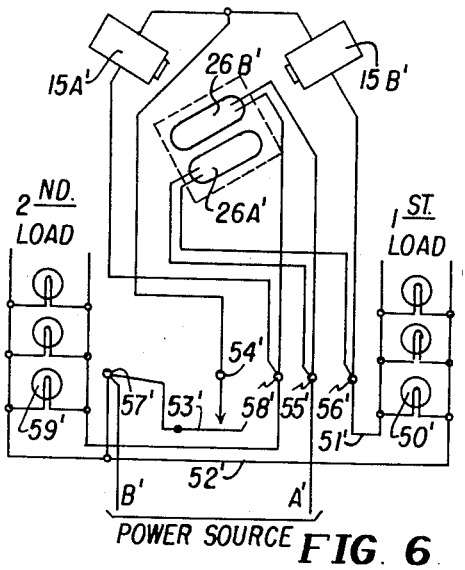
FIG. 6
FIG. 4D
INVENTOR.
Warren Tingley
BY Smith, Olsen & Baird
Attys.

Patented Apr. 7, 1953

2,634,348

UNITED STATES PATENT OFFICE 2,634,348

ELECTROMAGNETIC SEQUENCE RELAY SWITCH

Warren Tingley, Elmhurst, Ill.

Application August 14, 1951, Serial No. 241,788

3 Claims. (Cl. 200—112)

This invention relates in general to electrically controlled mechanisms and more specifically to electromagnetic switching relays.

The object of the present invention is to provide an improved electromagnetic relay which is economical in construction and reliable and positive in operation.

It is another object of the invention to provide a relay mechanism of simplified construction which will aternatively control two load circuits through circuit controlling elements on the relay mechanism in response to successive operations thereof.

It is still another object of the invention to provide in a relay mechanism an improved cradle structure of non-magnetic material which is pivotally mounted between two coil windings of the relay structure and which is provided with a slidably mounted magnetizable member which is controlled by the coil windings to effect selective oscillatory pivotal rotation of the cradle structure.

It is still another object of the invention to provide a circuit network for a relay mechanism of the type noted whereby a first load circuit may be selectively energized incident to a first energization of the relay and whereby a second load circuit may be selectively energized incident to a second energization of the relay. With this circuit network the first and second load circuits are alternately energized in response to successive operations of the relay.

It is still another object of the invention to provide in a circuit network of the type noted, a relay structure having two independent coil windings which are alternately energized to alternately control two independent load circuits and whereby each of the coil windings are retained in an energized condition in multiple with the associated loading circuit.

It is still another object of the invention to provide a modified circuit network for a relay mechanism of the type noted whereby first and second load circuits may be selectively energized in response to alternate energization of two independent coil windings on the relay structure and whereby each of the windings of the relay structure are retained in a deenergized condition with either one of the load circuits is in an energized condition.

The invention, both as to its organization and method of operation, together with further objects and advantages thereof, will best be understood by reference to the following specifications taken in connection with the accompanying drawings in which:

Fig. 4A shows a sectional view taken along line 4—4 of Fig. 2 and illustrates the position of the cradle and armature structure in response to the energization of the left-hand coil winding of the relay;

Fig. 4B shows another sectional view taken along line 4—4 of Fig. 2 and illustrates the position of the cradle and armature structure in response to the deenergization of the left-hand coil winding of the relay;

Fig. 4C shows still another sectional view taken along line 4—4 of Fig. 2 and illustrates the position of the cradle and armature structure in response to the energization of the right-hand coil winding of the relay;

Fig. 4D shows still another sectional view taken along line 4—4 of Fig. 2 and illustrates the position of the cradle and armature structure in response to the deenergization of the right-hand coil winding of the relay;

Fig. 5 shows a preferred form of a circuit network for the relay mechanism in which the two coil windings of the relay may be alternately energized to alternately select two load circuits and in which the two coil windings are respectively maintained energized in parallel with the associated selected load circuit; and Fig. 6 shows a modified form of a circuit network for the relay mechanism in which the two coil windings of the relay are alternately momentarily energized to alternately select the associated load circuits and are respectively disassociated from the associated load circuits incident to the selection thereof.

Figure 1:
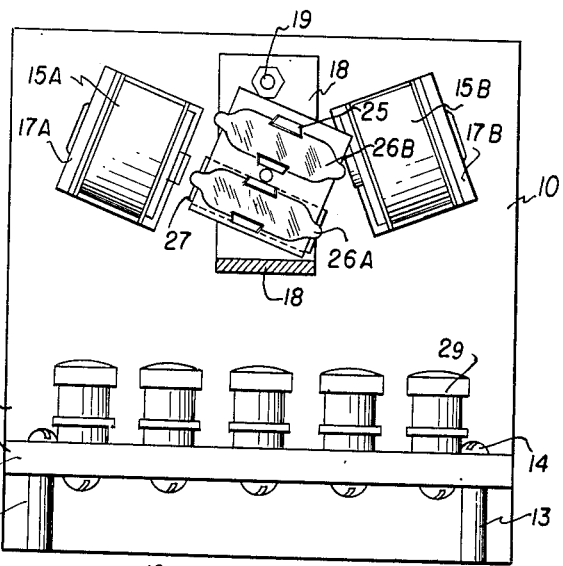
Fig. 1 shows a front view of the improved relay mechanism.
Figure 2:
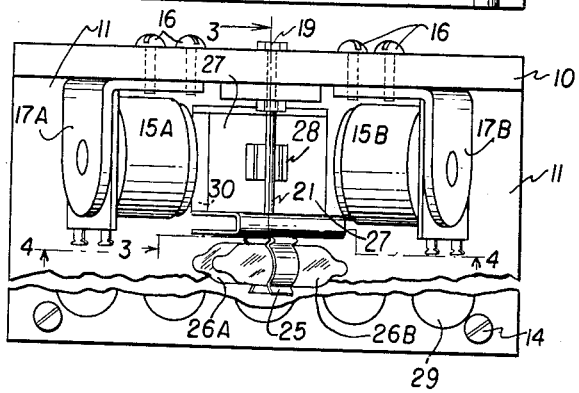
Fig. 2 shows a top view of the improved relay mechanism.
Figure 3:
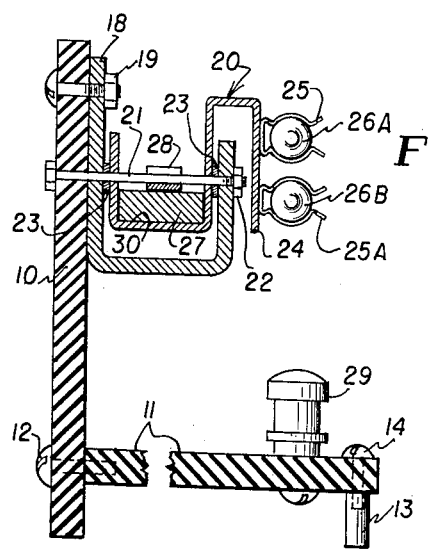
Fig. 3 shows a sectional view taken along line 3—3 of Fig. 2, with the cradle and armature structure in a horizontal position in order more clearly to illustrate the detail structure thereof.

Referring now to Figs. 1, 2 and 3 of the drawings, it will be seen that the relay mechanism includes an upstanding mounting panel 10 having a horizontal base panel 11 secured thereto by means of a plurality of screws 12. A pair of legs 13 are secured at opposite corners near the front edge of the base panel 11 by means of a plurality of screws 14 so that the upstanding mounting panel 10, the base panel 11 and the legs 13 form a suitable self-supporting structure for the relay mechanism. In order to obviate the necessity of insulating the various structural elements of the relay, the above noted panels are preferably formed of insulating material.

A pair of coil windings 15A and 15B are mounted on the panel 10 in spaced-apart relation with respect to each other as is best illustrated in Fig. 1 by means of a plurality of screws 16 which are threaded through the panel 10 into the L-shaped brackets 17A and 17B which respectively form the heel piece for the coil windings 15A and 15B. In mounting the coils 15A and 15B on the panel 10, they are respectively positioned to form an angle of approximately 30 degrees between a line drawn through the core of the windings and the base panel 11.

A substantial U-shaped cradle mounting bracket 18 for pivotally supporting the cradle and armature structure, to be described hereinafter, is secured to the panel 10 by means of the bolt 19. The mounting bracket 18 is centrally disposed between the two coils 15A and 15B as is clearly illustrated in Fig. 1 so that the cradle and armature structure supported thereon may be moved into alternate alignment with the cores of the respective coil windings.

Referring now to Fig. 3 it will be seen that a cradlelike structure 20 is pivotally supported between the upstanding legs of the U-shaped bracket 18 by a pivot pin 21 which is threaded through panel 10, the two legs of the U-shaped bracket 18 and the two spaced apart legs of the cradle 20 and secured in place by means of the nut 22. A pair of bushings 23 are provided on the pivot pin 21 in order to retain cradle 20 centrally disposed between the upstanding legs of the U-shaped bracket 18 and in order to reduce frictional engagement therebetween. As is best illustrated in Fig. 3 the cradle 20 is formed so that it straddles the right-hand upstanding leg of the U-shaped bracket 18 in order to provide a mounting panel arrangement for a pair of mercury contact elements 26A and 26B. More specifically, the downwardly extending leg 24 on the cradle 20 is provided with a pair of spring clips 25 which are secured to the leg 24 in any conventional manner. These clips respectively retain the mercury contact elements 26A and 26B in demountable position on the cradle 20.

An armature 27 of soft iron or other magnetizable material is slidably mounted on the surface 30 of the cradle 20, as is best illustrated in Fig. 3, by means of a U-shaped retaining bracket 28 rigidly secured thereto. The upstanding legs of the U-shaped retaining bracket 28 extend upwardly above the upper surface of the armature 27 sufficiently to engage therebetween the pivot pin 21. The upstanding legs of the retaining bracket 28 are spaced apart sufficiently to allow the armature 28 to slide a predetermined distance on surface 30 of the cradle 20 either to the left or to the right of the pin 21. In this manner the weight of the armature 27 may be moved to unbalance the cradle to cause it to be tilted or rocked either to the left or the right as is illustrated in Figs. 1, 2, and 4A to 4D, inclusive. The manner in which the coils 15A and 15B magnetically control the position of the magnetizable armature 27 will be described hereinafter in conjunction with the operation of the circuit networks illustrated in Figs. 5 and 6. It should be noted, however, that the U-shaped cradle mounting bracket 18 and the cradle 20 are formed of non-magnetizable material so that they will not interfere with or affect the selective positioning of the armature 27 by the coil windings 15A and 15B.

For convenience in electrically connecting the various control leads to the coil windings 15A and 15B and the mercury controlling elements 26A and 26B, a plurality of binding posts 29 are secured along the front edge of the base panel 11. Consequently, the local wiring between the binding posts and the various elements of the relay may be wired during the manufacture of the relay structure, and the external wiring including the load circuits and the power circuits may be connected thereto through the binding posts 29.

In order more clearly to describe the pivotal rocking action of the cradle 20 and the slidable armature 27 thereon; reference should now be made to Figs. 4A, 4B, 4C and 4D. For this purpose, it will be assumed that the cradle 20 is in the position illustrated in Fig. 4A and that the armature 27 is in the dotted position on the incline plane surface 30 of the cradle 20. If the coil winding 15A is energized at this time, the magnetic flux generated by the coil winding will attract the armature 27 and slide it diagonally along the surface 30 of the cradle 20 until the right-hand upstanding leg of the U-shaped retaining bracket 28 engages the pivot pin 21. The armature 27 will be retained in this position until the coil 15A is deenergized and when this occurs, the attractive force of the coil 15A will be removed so that the weight of the armature 27, which is predominantly to the left of the pivot pin 21, will cause the cradle 20 to rotate in a counterclockwise direction to the position illustrated in Fig. 4B. In this position the mercury contacts elements 26A and 26B will be tilted so that the mercury therein will flow to the left-hand ends thereof.

If the coil 15B (Fig. 4B) is now energized, the armature 27 will now be attracted to the position illustrated in Fig. 4C. It should be noted, however, that after the armature 27 and the cradle 20 have assumed the position illustrated in Fig. 4B, the coil 15A may be energized but it will have no control over the armature 27. In other words, the magnetizable armature 27 when moved to the position illustrated in Fig. 4B has been rotated sufficiently to remove it from the influence of the magnetic field created incident of the energization of the coil winding 15A.

Referring now to Fig. 4C, it will be seen that the coil 15B has now been energized to slide the armature 27 up the incline plane surface 30 of the cradle 20 sufficiently to cause the left-hand upstanding leg of the retaining bracket 28 to engage the pivot pin 21. As long as the coil winding 15B is retained in an energized condition, the armature 27 will remain in the position shown in Fig. 4C. However, as soon as the coil winding is deenergized the weight of the armature 27, which is now predominantly positioned to the right of the pivot pin 21, will now cause the cradle 20 to rotate to the position illustrated in Fig. 4D. Consequently, the mercury contact elements 26A and 26B will now be positioned so that the mercury therein will flow to the right ends thereof to complete the electrical circuits between the contact elements provided in the ends of the mercury elements in a conventional manner. It should be understood, however, that the mercury elements may be placed in the clips 25 so that circuits may be completed through the one or both mercury elements when they are tilted to the left or to the right.

After the coil 15B has been deenergized and the armature has tilted the cradle 20 to the position illustrated in Fig. 4D, reenergization of the coil 15B will have no effect upon the armature 27 until after it has been controlled by the coil 15A in the manner described previously.

Referring now to Fig. 5, a description will be given of the preferred form of the circuit control network for the relay structure. In this circuit the coil winding 15B is energized in multiple with a first load circuit including the lamps 50. Although the load circuit illustrated includes a plurality of lamps 50, it will be understood by those skilled in the art that any form of electrical apparatus may be connected to this load circuit. The circuit for energizing the coil winding 15B includes the power source, which for the purpose of this description will be assumed to be 110 volt alternating current, the condutcor A, the switch 53, binding post 55, mercury element 26A, binding post 56, winding of the coil 15B, binding post 57 and the conductor B extend to the power source. In this circuit, the coil 15B is in its energized position to retain the armature 27 in the position illustrated in Fig. 4C. As long as the armature 27 and the mercury element 26A is tilted to the position illustrated in Fig. 5, the first load circuit will be energized over a circuit including the power source, conductor A, switch 53, binding post 55, mercury element 26A, binding post 56, the lamps 50 in multiple, binding post 57 and the conductor B extending to the power source. Thus it will be seen that the first load circuit including the lamps 50 is normally retained energized in parallel with the energizing circuit for the coil winding 15B.

If the switch 53 is now momentarily actuated, the above traced circuits will be momentarily interrupted and the coil winding 15B will deenergize. In response to the deenergization of the coil winding 15B the armature 27 will tilt the associated cradle to the position illustrated in Fig. 4D and cause the associated mercury elements 26A and 26B to be tilted sufficiently in a clockwise direction (Fig. 5) to cause the mercury therein to flow away from the terminals of the element 26A and flow toward the terminals of the element 26B. As a result of the changeover of the positions of the mercury elements 26A and 26B, the previously described circuits for the coil winding 15B and the first load circuit will be opened when the switch 53 is again closed. However, in response to the closure of the switch 53 a new multiple circuit will be completed for energizing the coil winding 15A and the second load circuit including the lamps 59. This circuit may be traced from the conductor A extending to the power source, switch 53, binding post 55, terminals of the mercury element 26B, binding post 58, the second load circuit including the lamp 59, binding post 57 and the conductor B extending to the power source. Consequently, the second load circuit including the lamp circuit 59 will be energized. In addition to the foregoing, it will be seen that a multiple circuit including the coil winding 15A is bridged across the binding posts 57 and 58 of the above described circuit in order to energize the coil winding 15A in multiple with the second load circuit. In response to the energization of the coil winding 15A, the armature 27 will be attracted to the position illustrated in Fig. 4A and it will be retained in this position until the multiple circuit for the coil winding 15A and the second load circuit is interrupted by a momentary operation of the switch 53. When this occurs the coil winding 15A will deenergize, in the manner previously described, and the energizing circuit for the second load circuit will be interrupted. As a result thereof, the armature 27 causes the associated cradle to rotate in a counterclockwise direction to the position illustrated in Fig. 4B. It should be noted that after the cradle is thus rotated the mercury elements 26A and 26B will again be returned to the position illustrated in Fig. 5. If the switch 53 is again closed, the previously traced circuit is again completed for energizing the coil winding 15B in multiple with the first load circuit including the lamps 50.

From the foregoing description of the operation of the improved sequence relay mechanism in a circuit controlling network of the type illustrated in Fig. 5, it will be understood that the coil windings 15A and 15B are alternately energized in multiple with the alternate energization of the first and second load circuits by the mere momentary interruptions of the switch 53 included in the power source circuit. One of the important features of the circuit network illustrated in Fig. 5 is that the coil winding 15B is held in its energized position as long as the first load circuit is energized and that the coil 15A is held energized as long as the second load circuit is energized. Consequently, if the current flow from the power source is momentarily interrupted for any reason whatsoever the energized coil winding will deenergize and it will automatically transfer the power source connection to the alternate load circuit. With this arrangement, a first load circuit and its associated coil winding may be normally energized and if the power source momentarily fails to supply the energizing current, the coil winding will deenergize and automatically transfer the power supply to the second coil winding and associated load circuit. Thus the power source may be automatically transferred from a first load circuit to a second load circuit and vice versa incident to a momentary interruption in the circuit. Of course, the selective transfer of the current supply to the first and second load circuits may be made by means of the switch 53.

In the modified circuit controlling network shown in Fig. 6 the power source including the conductors A' and B' is normally connected to either the first load circuit including the lamp circuit 50' through the terminals of the mercury elements 26A' or to the second load circuit including the lamps 59' through the terminals of the mercury elements 26B' depending upon the angular position of the mercury elements. In the modified circuit shown in Fig. 6, the coil windings 15A' and 15B' are normally disconnected from their associated load circuits by means of the normally open switch 53'. Successive momentary operations of the switch 53' will alternately complete energizing circuits for the coil windings 15B' and 15A' in order to control the angular position of the mercury elements.

As is illustrated in Fig. 6, the 110 volt alternating current power source is connected to the first load circuit over a circuit including the conductor A', binding post 55', the terminals of the mercury element 26A', binding post 56', the first load circuit including the lamps 50', binding post 57' and the conductor B' extending to the power source. Accordingly, the first load circuit is normally energized. In order to transfer the power source from the first load circuit including the lamps 50' to the second load circuit including the lamps 59', a momentary energizing circuit may be completed for the coil winding 15B' by momentarily controlling the switch 53'. More specifically, when the switch 53' is closed, a circuit is completed for energizing the coil 15B' which may be traced from the power source by way of the conductor A', binding post 55', the terminals of the mercury element 26A', binding post 56', the winding of the coil 15B', binding post 54', switch 53', binding post 57' and the conductor B' extending to the power source. Incident to the energization of the coil 15B, the armature 27 on the cradle 20 is moved from the position illustrated in Fig. 4B to the position illustrated in Fig. 4C. As soon as the switch 53' is opened, the above traced energizing circuit is interrupted thereby causing the coil winding 15B' to deenergize. Incident to the deenergization of the coil 15B', the armature 27 rotates the cradle 20 in a clockwise direction from the position illustrated in Fig. 4C to the position illustrated in Fig. 4D. In this position the angle of the mercury elements 26A' and 26B' is altered so that the mercury therein interrupts the previously traced energizing circuit for the first load circuit, and simultaneously therewith, the mercury in the mercury element 26B' completes an energizing circuit for the second load circuit. The last mentioned circuit may be traced from the power source by way of the conductor A', binding post 55', the terminals of the mercury element 26B', binding post 56', the second load circuit including the lamps 59', binding post 57' and the conductor B' extending to the power source. The above traced energization circuit for the second load circuit is now retained until a momentary energizing circuit is completed by means of the switch 53' for energizing the coil winding 15A'.

When the switch 53' is again closed, an energizing circuit will be completed for the coil winding 15A' over a circuit including the power source, conductor A', binding post 55', the terminals of the mercury element 26B', binding post 58', coil winding 15A', binding post 54', switch 53', binding post 57' and the conductor B' extending to the power source. Upon energizing, the coil winding 15A' attracts the armature 27 from the position illustrated in Fig. 4D to the position illustrated in Fig. 4A. When the switch 53' is opened, the above traced energizing circuit is interrupted and the coil winding 15A' deenergizes thereby to cause the armature 27 to rotate the cradle 20 from the position illustrated in Fig. 4A to the position illustrated in Fig. 4B. In this position the mercury element 26B' interrupts the energizing circuit for the second load circuit and the mercury element 26A' again completes the energizing circuit for the first load circuit.

From the foregoing description of the operation of the circuit controlling network for the improved relay, as illustrated in Fig. 6, it will be understood that the switch 53' may be remotely located with respect to the position of the relay structure and that the coil windings 15A' and 15B' are normally in a deenergized condition. It will also be understood that the momentary sequential operation of the switch 53' will alternately energize the coil windings 15B' and 15A' in order to select alternately the first and second load circuits. In this circuit arrangement, however, the momentary interruption of the current supplied from the power source will not in any way affect the selection of one or the other load circuits, the selection of the first and second load circuits being directly controlled by the selective energization of the coil windings 15A' and 15B' by means of the remotely located switch 53'.

It will be understood that various modifications may be made in the relay structure and circuit controlling networks which are within the true spirit and scope of the present invention.

What is claimed is:

1. A sequence relay comprising a mounting, a pair of spaced-apart electromagnets supported on said mounting, a cradle, a U-shaped bracket supported on said mounting between said electromagnets, means pivotally supporting said cradle between the legs of said U-shaped bracket, an armature supported on said cradle for sliding movement thereon, means carried by said armature restricting the sliding movement of said armature on said cradle between a predetermined first position and a predetermined second position, the energizing of the first of said electromagnets controlling said armature to slide the same on said cradle to said first predetermined position and the deenergization of said first electromagnet rendering said armature effective to rotate said cradle in one direction about said pivot means to place said armature in a position to be controlled only by the second of said electromagnets, the energization of the second of said electromagnets controlling said armature to slide the same on said cradle to said predetermined second position and the deenergization of said second electromagnet rendering said armature effective to rotate said cradle in another direction about said pivot means to place said armature in a position to again be controlled by said first electromagnet, and circuit controlling means supported on said cradle selectively controlled in accordance with direction of rotation of said cradle.

2. A sequence relay comprising a mounting, a pair of spaced-apart electromagnets supported on said mounting, a cradle, a U-shaped bracket supported on said mounting between said electromagnets, means pivotally supporting said cradle between the legs of U-shaped bracket so that said cradle may be rotated between a first rotary position and a second rotary position, an armature supported on said cradle for sliding movement thereon, means carried by said armature restricting the sliding movement of said armature on said cradle between a predetermined first position and a predetermined second position, the energization of the first of said magnets controlling said armature to slide the same on said cradle to said predetermined first position and the deenergization of said first electromagnet rendering said armature effective to rotate said cradle in one direction about said pivot means to said first rotary position to place said armature in a position to be controlled only by energization of the second of said electromagnets, the energization of the second of said electromagnets controlling said armature to slide the same on said cradle to said predetermined second position and the deenergization of said second electromagnet rendering said armature effective to rotate said cradle in another direction about said pivot means to said second rotary position to again place said armature in a position to be controlled only by the energization of the first of said electromagnets, and circuit controlling means selectively controlled in accordance with said first and secondary rotary positions of said cradle.

3. A sequence relay comprising a mounting, a pair of spaced-apart electromagnets supported on said mounting, a cradle, a U-shaped bracket supported on said mounting between said electromagnets, means pivotally supporting said cradle between the legs of U-shaped bracket so that said cradle may be alternately rotated on said pivot from a first rotary position to a second rotary position and from said second rotary position to said first rotary position, an armature supported on said cradle for sliding movement thereon from a predetermined first position to a predetermined second position and from said predetermined second position to said predetermined first position in order to effect alternate rotation of said cradle, means carried by said armature and cooperating with said pivot means restricting the sliding movement of said armature on said cradle between said predetermined first and second positions, the energization of the first of said electromagnets magnetically controlling said armature to slide the same on said cradle to said predetermined first position and the deenergization of said first electromagnet rendering said armature effective to rotate said cradle in one direction about said pivot means from said first rotary position to said second rotary position to place said armature in position to be magnetically controlled only by the second of said electromagnet, the energization of the second of said electromagnets magnetically controlling said armature to slide the same on said cradle from said predetermined first position to said predetermined second position and the deenergization of said second electromagnet rendering said armature effective to rotate said cradle in another direction about said pivot means from said second rotary position back to said first rotary position to place said armature in a position to be magnetically controlled by said first electromagnet, and circuit controlling means supported on said cradle selectively controlled in accordance with the rotation of said cradle to said first rotary position and to said second rotary position.

WARREN TINGLEY.

REFERENCES CITED

The following references are of record in the file of this patent:

UNITED STATES PATENTS

| Number | Name | Date |
| --- | --- | --- |
| 1,074,911 | Unverricht | Oct. 7, 1913 |
| 1,275,047 | Krantz | Aug. 6, 1918 |
| 1,619,080 | McDonald | Mar. 1, 1927 |
| 1,908,009 | Bogle | May 9, 1933 |

FOREIGN PATENTS

| Number | Country | Date |
| --- | --- | --- |
| 641,891 | France | May 1, 1928 |